United States Patent
Koch et al.

[11] Patent Number: 6,153,946
[45] Date of Patent: Nov. 28, 2000

[54] METHOD AND APPARATUS FOR PROVIDING REDUNDANT POWER BY CONNECTING POWER SUPPLIES INTO A SEGMENT OR RING

[75] Inventors: James K. Koch, Rocklin; Thane Larson, Roseville, both of Calif.

[73] Assignee: Hewlett-Packard Company, Palo Alto, Calif.

[21] Appl. No.: 09/183,333

[22] Filed: Oct. 30, 1998

[51] Int. Cl.$^7$ .................................................. H02J 9/00
[52] U.S. Cl. ........................................ 307/64; 395/182.2
[58] Field of Search .................................. 307/18, 19, 43, 307/44, 64, 53; 363/65; 395/182.2, 750.01

[56] References Cited

U.S. PATENT DOCUMENTS 5,745,670  4/1998  Linde .......................................... 307/65

*Primary Examiner*—Jeffrey Gaffin
*Assistant Examiner*—Roberto Rios
*Attorney, Agent, or Firm*—David A. Plettner

[57] ABSTRACT

A method and apparatus provide redundant power by connecting power supplies in a segment or ring. In a first embodiment, a redundant power supply is provided at the "top" of a redundant power segment, with one or more computer devices coupled "beneath" the redundant power supply. If the power supply of any device fails, that device "borrows" power from the device immediately upstream in the redundant power segment. If the power supply of the device immediately upstream in the redundant power segment no longer has sufficient capacity to power its own circuits, that device borrows power form the device immediately upstream from it. This process may continue until the power requirements of all devices are met by the excess capacities of all power supplies in devices upstream from the device with the failing power supply, or until the redundant power supply is reached. In essence, the present invention creates a "cascade effect" wherein each devices fulfills any power deficiency from the device immediately upstream. In a second embodiment of the invention, a plurality of devices are coupled into a ring to provide redundant power for each other. When a power supply in the ring fails, the excess capacities of the remaining power supplies provide power for all the devices. Accordingly, a redundant power supply is not required. In each embodiment, a network of diodes prevents a failed power supply from shorting out the remaining power supplies, while also allowing all devices to continue receiving power.

24 Claims, 4 Drawing Sheets

METHOD AND APPARATUS FOR
PROVIDING REDUNDANT POWER BY
CONNECTING POWER SUPPLIES INTO A
SEGMENT OR RING

FIELD OF THE INVENTION

The present invention relates to power supplies. More specifically, the present invention relates to providing redundant power by connecting power supples into a segment or ring.

DESCRIPTION OF THE RELATED ART

In the art of computing, it is becoming increasingly more important to provide mechanisms that minimize the loss of unscheduled "down time" in data centers. The term "high availability (HA) computing" is often used to refer to computer systems that include these mechanisms.

HA mechanisms are provided at many levels. For example, a data center may have redundant computer systems so that if one system fails, the workload can be seamlessly shifted to another system. In addition, data may be stored in a disk array subsystem that allows any single disk drive to fail without affecting the ability of the disk array subsystem to continue operating. Also, many software techniques that increase the availability of computer systems are known in the art.

One of the most important aspects of HA computing is ensuring that computer circuits receive an uninterrupted supply of DC power. Typically, a loss of DC power is caused by a loss of AC power to the AC-to-DC power supplies, or a failure of an AC-to-DC power supply. Uninterruptible AC power supplies address the problem of AC power loss by providing a constant supply of AC power to AC-to-DC power supplies. Typically, uninterruptible power supplies are implemented using rechargeable batteries, and in some cases, generators.

Redundant AC-to-DC power supplies address the problem of AC-to-DC power supply failure. In the prior art, redundant power supplies have been deployed on a "per system" basis. Typically, one redundant power supply is provided for each system, which is known in the art as "N+1" redundancy. For example, consider a computer rack (which are commonly used in data centers) having a computer system, a LAN hub, and a disk storage system mounted therein. Further assume that the computer system and the disk storage system each require two AC-to-DC power supplies, while the LAN hub requires a single AC-to-DC power supply. If such systems are provided with N+1 redundancy, then the computer system and the disk storage system will each have three AC-to-DC power supplies, and the LAN hub will have two AC-to-DC power supplies. Accordingly, if a single AC-to-DC power supply fails in a particular system, that system will have a redundant power supply which can take the place of the failed power supply.

While N+1 redundancy ensures that a single failure of an AC-to-DC power supply will not disrupt operation of the system, this redundancy comes at a fairly high price because each system has a redundant power supply. For example, a computer rack having five systems mounted therein, with each system having a redundant AC-to-DC power supply, will have five redundant power supplies. Obviously, in a large data center having many computer racks, a large number of redundant power supplies are required to provide "N+1" redundancy.

SUMMARY OF THE INVENTION

The present invention is a method and apparatus that provides redundant power by connecting power supplies in a segment or ring. In a first embodiment, a redundant power supply is provided at the "top" of a redundant power segment, with one or more computer devices coupled "beneath" the redundant power supply. If the power supply of any device fails, that device "borrows" power from the device immediately upstream in the redundant power segment. If the power supply of the device immediately upstream in the redundant power segment no longer has sufficient capacity to power its own circuits, that device borrows power form the device immediately upstream from it. This process may continue until the power requirements of all devices are met by the excess capacities of all power supplies in devices upstream from the device with the failing power supply, or until the redundant power supply is reached. In essence, the present invention creates a "cascade effect" wherein each devices fulfills any power deficiency from the device immediately upstream. The primary requirement of this embodiment is that each upstream power supply in the redundant segment have sufficient capacity to power the load immediately downstream in the redundant segment, and that the redundant power supply have sufficient capacity to power the device with the highest power requirements.

In a second embodiment of the invention, a plurality of devices are coupled into a ring to provide redundant power for each other. When a power supply in the ring fails, the excess capacities of the remaining power supplies provide power for all the devices. Accordingly, a redundant power supply is not required. The primary requirement of this embodiment is that each upstream power supply in the ring have sufficient capacity to drive the load in the device immediately downstream in the ring, and that the sum of all the maximum power ratings of the power supplies minus the highest single power rating of one of the power supplies must be greater than or equal to the sum of the maximum power requirements of all the device circuits in the ring.

In each embodiment, a network of diodes prevents a failed power supply from shorting out the remaining power supplies, while also allowing all devices to continue receiving power. The power sharing mechanisms of the present invention may be provided in the computer device, and not the power supply, thereby allowing generic "off-the-shelf" power supplies to be used with the present invention and thereby allowing a failed power supply to be swapped with a new power supply without interrupting operation of the device. Alternatively, the power sharing mechanisms of the present invention may be provided within the power supply, thereby allowing computer devices not specifically designed to support a redundant power segment or ring to enjoy the benefits of the present invention by simply using a power supply designed in accordance with the present invention.

The present invention reduces the number of redundant power supplies required for a plurality of computer devices by reducing or eliminating the need for redundant power supplies. In a large data center, the present invention produces substantial cost savings while still providing the same level of redundant power supply reliability provided by prior art single device N+1 power supply configurations.

DETAILED DESCRIPTION OF THE PREFERRED EMBODIMENTS

The present invention is a method and apparatus that provides redundant power by connecting power supplies in a segment or ring. In one embodiment, redundancy is provided by an extra power supply in a power supply segment. In another embodiment, redundancy is provided by the excess capacity present in the remaining power supplies in a ring when one power supply in the ring fails.

Figure 1A:
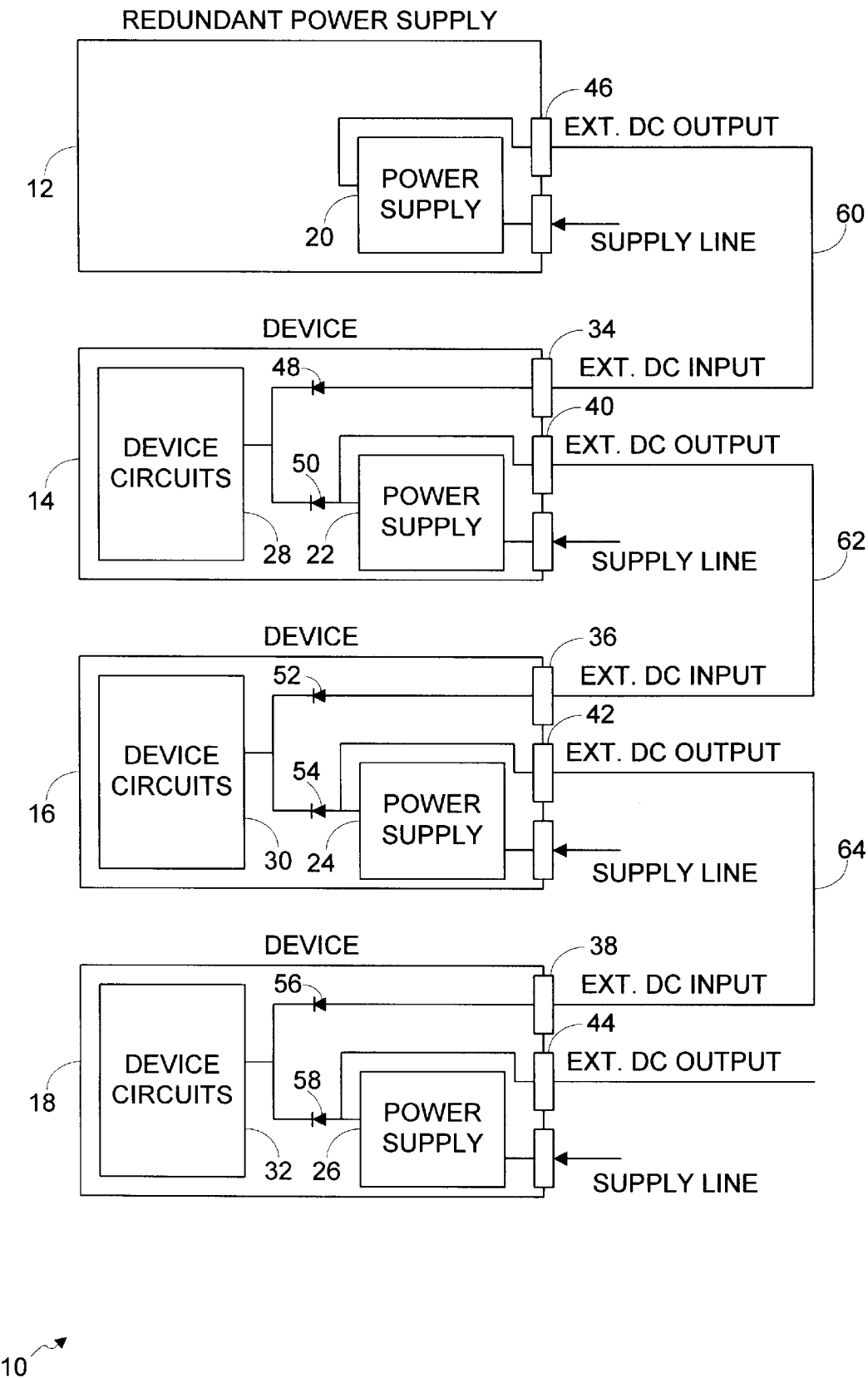
FIG. 1A is a block diagram showing one embodiment of the present invention in which a plurality of devices are coupled together into a redundant power segment to provide power supply redundancy in accordance with the present invention.

FIG. 1A is a block diagram showing one embodiment of the present invention in which a plurality of devices 10 are coupled together to provide power supply redundancy in accordance with the present invention. Plurality of devices 10 include a redundant power supply 12, and devices 14, 16, and 18. Devices 14, 16, and 18 may be computer systems, LAN hubs, disk storage systems, banks of modems, or any other computer devices known in the art.

Redundant power supply includes power supply 20. Similarly, devices 14, 16, and 18 include power supplies 22, 24, and 26, respectively. Each power supply is coupled to a supply line, which may also be coupled to an uninterruptible power supply, as is known in the art. Typically, power supples 20, 22, 24, and 26 will be AC-to-DC power supplies which take an AC supply voltage, such as a 120 volt AC supply voltage at 60 Hz, and produce a DC distribution voltage, such as +48.0 volts DC. However, those skilled in the art will recognize that the power supplies may receive any suitable supply voltage (such as a +96.0 volt DC supply voltage or a 220 volt 3-phase supply voltage at 440 Hz), and produce any suitable distribution voltage (such as + or − 12, 24, or 48 volts).

Devices 14, 16, and 18 include device circuits include 28, 30, and 32, external DC input connector 34, 36, and 38, and external DC output connector 40, 42, and 44, respectively. Note that the device circuits 28, 30, and 32 will typically include DC-to-DC converters that receive a distribution voltage, such as +48.0 volts DC, and produce the voltages actually required within the device circuits, such as +5.0, −5.0, +3.3, +12.0, −12.0 volts, or any other required voltage. Typically, such DC-to-DC converters are very robust, and have mean time between failure (MTBF) rates in the millions of hours. In contrast, AC-to-DC power supplies, which will typically be used for supplies 20, 22, 24, and 26, have much higher failure rates because of exposure to high voltages and transients that tend to increase the failure rates of components in the power supplies.

Redundant power supply 12 also includes external DC output connector 46. Power sharing cable 60 is coupled between external DC output connector 46 of redundant power supply 12 and external DC input connector 34 of device 14, power sharing cable 62 is coupled between external DC output connector 40 of device 14 and external DC input connector 36 of device 16, and power sharing cable 64 is coupled between external DC output connector 42 of device 16 and external DC input connector 38 of device 18. Within each device are a pair of diodes that enable DC power sharing and prevent a failing power supply from shorting out other power supplies. Accordingly, device 14 includes diodes 48 and 50, device 16 includes diodes 52 and 54, and device 18 includes diodes 56 and 58.

The redundant power scheme shown in FIG. 1A illustrates how redundant DC power can be provided for a single distribution voltage, such as +48.0 volts. However, if it is desired provide redundant power for more than one distribution voltage, those skilled in the art will recognize that the redundant power features discussed below with reference to FIG. 1A must be provided for each distribution voltage. The present invention can be used with any distribution voltage, but it is advantageous to use a higher voltage because less current is require to deliver the same amount of power, and higher distribution voltages lessen the effect of th voltage drops over the diodes. Those skilled in the art will recognize the orientations of diodes 48, 50, 52, 54, 56, and 58 provide redundant sharing of a positive distribution voltage, and the orientations would need to be reversed to support redundant sharing of a negative distribution voltage.

For the sake of illustrating the present invention, assume that each of the device circuits 28, 30, and 32 draw 100 watts at +48.0 volts. Further assume that power supplies 20, 22, 24, and 26 are each rated to supply up to 100 watts at +48.0 volts, and power supply 24 of device 16 fails, and the output of supply 24 drops to 0.0 volts.

Diode 56 in device 18 prevents the 0.0 volt output of power supply 24 of device 16 from shorting out the +48.0 distribution voltage from power supply 26 in device 18, which is present at the circuit node formed at the cathodes of diodes 56 and 58 and the distribution voltage input of device 32. Accordingly, device 18 continues to function normally with the power supplied by its own power supply (supply 26).

In device 16 device circuits 30 continue to require 100 watts at +48.0 volts, but supply 24 is dead, so current flows from power supply 22 of device 14 to device circuits 30 of device 16 via external DC output connector 40 of device 14, power sharing cable 62, external DC input connector 36 of device 16, and diode 52 of device 16. Diode 54 of device 16 prevents the voltage supplied by supply 22 of device 14 from being shorted out by the 0.0 volt output of supply 24 of device 16. At this point, device circuits 30 of device 16 are "borrowing" 100% of the capacity of supply 22 of device 14.

In device 16, supply 22 is now being used to provide power to device 16, so device circuits 28 of device 14 receive power from power supply 20 of redundant power supply 12 via external DC output connector 46 of redundant power supply 12, power sharing cable 60, external DC input connector 34 of device 14, and diode 48 of device 14.

Accordingly devices 14, 16, and 18 continue to function normally, even though power supply 24 of device 16 has failed. In essence, the present invention provides a "cascade effect" wherein each load draws needed power from the upstream device in the redundant segment. Note that power supply 24 of device 16 can be replaced and restored to normal operation without requiring interruption of power to device circuits 30 of device 16.

Of course, most computer devices have power supples that are rated to supply more power than the power required by the load to which they are attached. Assume that each of the device circuits 28, 30, and 32 requires 100 watts at +48.0 volts, and each power supply 20, 22, 24, and 26 is rated to supply up to 150 watts at +48.0 volts. Further assume that power supply 2 of device 18 fails. Device 18 will draw 100 watts from device 16, device 16 will receive 50 watts from its own power supply 24 and 50 watts from power supply 22 of device 1, and device 14 will receive 100 watts from its own power supply 22. Accordingly, redundant power supply 12 is not actually needed and the excess capacity of supplies 22 and 24 are adequate to ensure that devices 14, 16, and 16 continue to operate normally.

The primary requirement of this embodiment is that each upstream power supply in the redundant segment has sufficient capacity to power the load immediately downstream in the redundant segment. In a typical large data center (e.g., a large Internet service provider) wherein a redundant power segment is formed in each computer rack, this requirement will usually not create difficulty because it is very common to mount a large number of identical devices in a common computer rack. For example, in such a data center, several computer racks may contain a large number of identical computer systems, several racks may contain a large number of identical disk storage systems, and so on. Since the computer devices mounted in each rack are identical, each device has the capacity to provide power for the device immediately downstream in the redundant segment.

However, if the computer devices have different loads and different power supply capacities, the device should be coupled into a redundant segment with the device having the lightest load at the "bottom" of the segment, and the device having the heaviest load at the "top" of the segment, with the redundant power supply capable of supplying the heaviest load. For example, assume that a redundant power segment includes a LAN hub, a computer system, and disk storage system, with the LAN hub drawing the least power, and the disk storage system drawing the most power. The LAN hub should be at the bottom of the redundant segment (device 18), the computer system should be the next device in the redundant segment (device 16), and the disk storage system should be at the top of the redundant segment (device 14), with redundant power supply 12 capable of driving the load of the disk storage system.

In one configuration, proper connection of the devices into a redundant segment can be ensured by keyed connectors on the power sharing cables and computer devices. For example, each power sharing cable could have a keyed male connector prong that has a diameter that varies with the load required by the device to which it is attached, and each external DC output connector could have a keyed female connector socket that has a diameter that varies with the rating of the power supply in that device. Consider a LAN hub capable of providing 100 watts and a disk subsystem requiring 200 watts. The disk subsystem should not be coupled in a redundant segment to receive redundant power from the LAN hub because the power supply of the LAN hub is not capable of providing the power required by the disk subsystem. However the LAN hub can receive redundant power from the disk subsystem. The external DC output connector of the LAN hub can be provided with a keyed female connector socket having a diameter of 0.25 inches, and the power sharing cable coupled to the disk subsystem can have a keyed male connector prong having a diameter of 0.35 inches. Accordingly, the keyed connectors will prevent the power sharing cable from the disk subsystem from being coupled to receive redundant power from the LAN hub. Further more, the external DC output connector of the disk subsystem hub can be provided with a keyed female connector socket having a diameter of 0.35 inches, and the power sharing cable coupled to the LAN hub can have a keyed male connector prong having a diameter of 0.25 inches, thereby allowing the LAN hub to receive redundant power from the disk subsystem. Of course, this example is simplified. However, one skilled in the art would be able to define and implement a standard that defines keyed connectors which ensure that a redundant segment is properly formed.

Note that in devices 14, 16, and 18, the redundant power sharing mechanism provided by the diodes and external DC input and output connectors are implemented in the device, and not the power supply. This allows generic "off-the-shelf " power supplies to be used with the present invention. This also allows a failed power supply to be swapped with a new power supply without interrupting operation of the device. However, the device must be designed with the redundant power sharing mechanism.

Figure 1B:
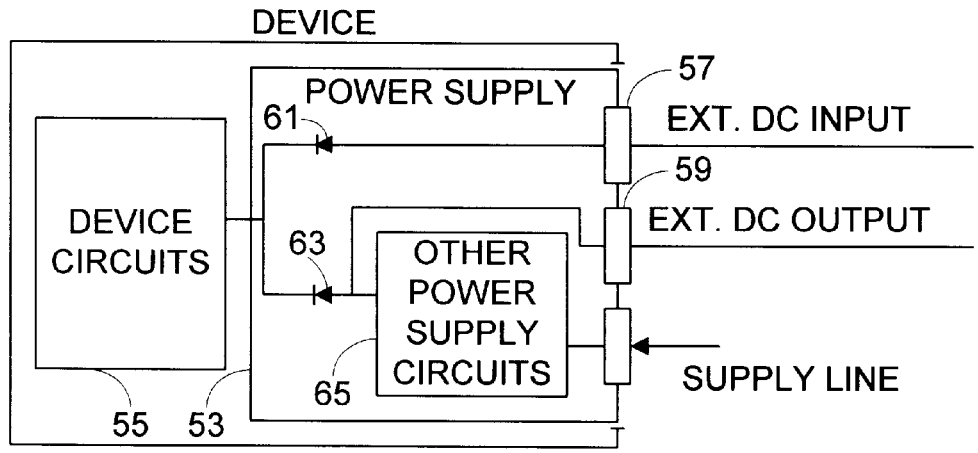
FIG. 1B is a block diagram showing one embodiment of the present invention in which diodes and external DC input and output connectors are provided within a power supply.
Figure 1C:
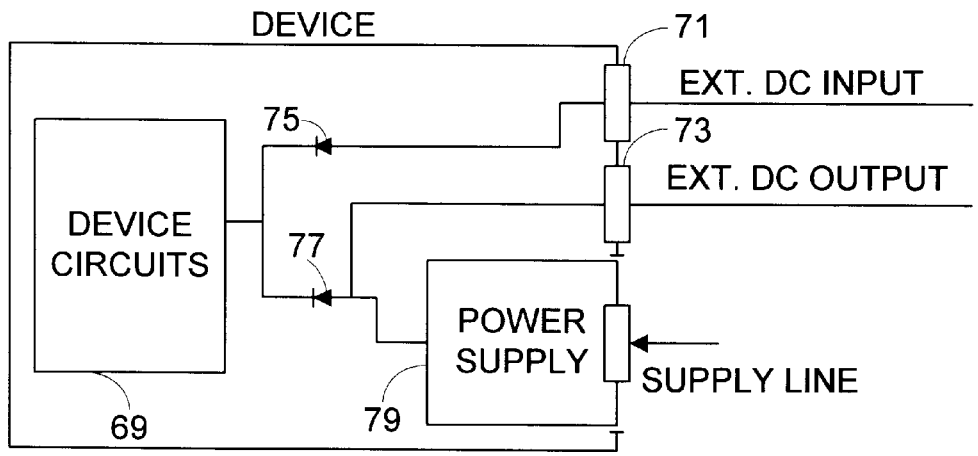
FIG. 1C is a block diagram showing another embodiment of the present invention in which diodes and external DC input and output connectors are provided within the device, but not the power supply.

It is also within the scope of the present invention to provide the diodes and external DC input and output connectors within the power supply, as shown in FIG. 1B. In FIG. 1B, device 51 includes device circuits 55 and power supply 53. Power supply 53 includes external DC input 57, external DC output 59, diodes 61 and 63, and other power supply circuits 65 such as a power converter. In such a configuration, the device need not be designed to support redundant power sharing since this function is provided by the power supply. Accordingly, any device having a power supply can be provided with the benefits of present invention by simply replacing the existing power supply with a power supply in accordance with the present invention. Assume that a customer has a computer rack having five devices, and three of the devices support a redundant power segment in accordance with the present invention, and two of the devices do not. The customer can simply replace the power supplies of the two devices that do not support a redundant power segment, thereby allowing the customer to couple all five devices into a redundant power segment. In addition, providing support for a redundant power segment in the power supply provides a vendor with a simple yet powerful manufacturing option. If the vendor desires that the device support a redundant power segment, a power supply in accordance with the present invention is simply provided in the device when the device is assembled. On the other hand, if the vendor does not want the device to support a redundant power segment, a generic power supply is provided in the device when the device is assembled. Providing support for a redundant power segment in the power supply also allows a vendor to add this functionality to existing products that have already been designed. Of course, it is also possible to use a generic power supply to share power in accordance with the present inention. FIG. 1C is a block diagram of a device 67, which includes device circuits 69. Included within device 67 is power supply 79, which may be a generic prior-art power supply. External DC input 71, external DC output 73, and diodes 75 and 77 are provided within device 67, but not power supply 79, and provide the redundant power sharing features described above. Accordingly, the embodiment shown in FIG. 1C allows one implementing the present invention to use generic low-cost off-the shelf power supplies.

In one particularly advantageous application of the present invention, the redundant power supply can be provided in each computer rack. Accordingly, the present invention provides N +1 redundancy for each rack, instead of each device in the rack, as in the prior art. Therefore, compared to the prior art, the present invention reduces the number of redundant power supplies required in a rack by I−1, where I is the number of devices mounted in the rack.

Returning to FIG. 1A, note that some power sharing may occur even though all power supplies are functioning normally. For example, if the distribution voltage provided by power supply 22 of device 14 is slightly higher than the distribution voltage provided by power supply 24 of device 16, device circuits 30 of device 16 may receive some power from both power supply 24 and power supply 22. It is not anticipated that this will be a problem. The power supplies should reach an equilibrium point wherein all loads are driven with a proper distribution voltage. However, if power sharing between devices when all supplies are functioning normally is not desired, a device can be provided with a power sharing mechanism as shown in FIG. 2.

Figure 2:
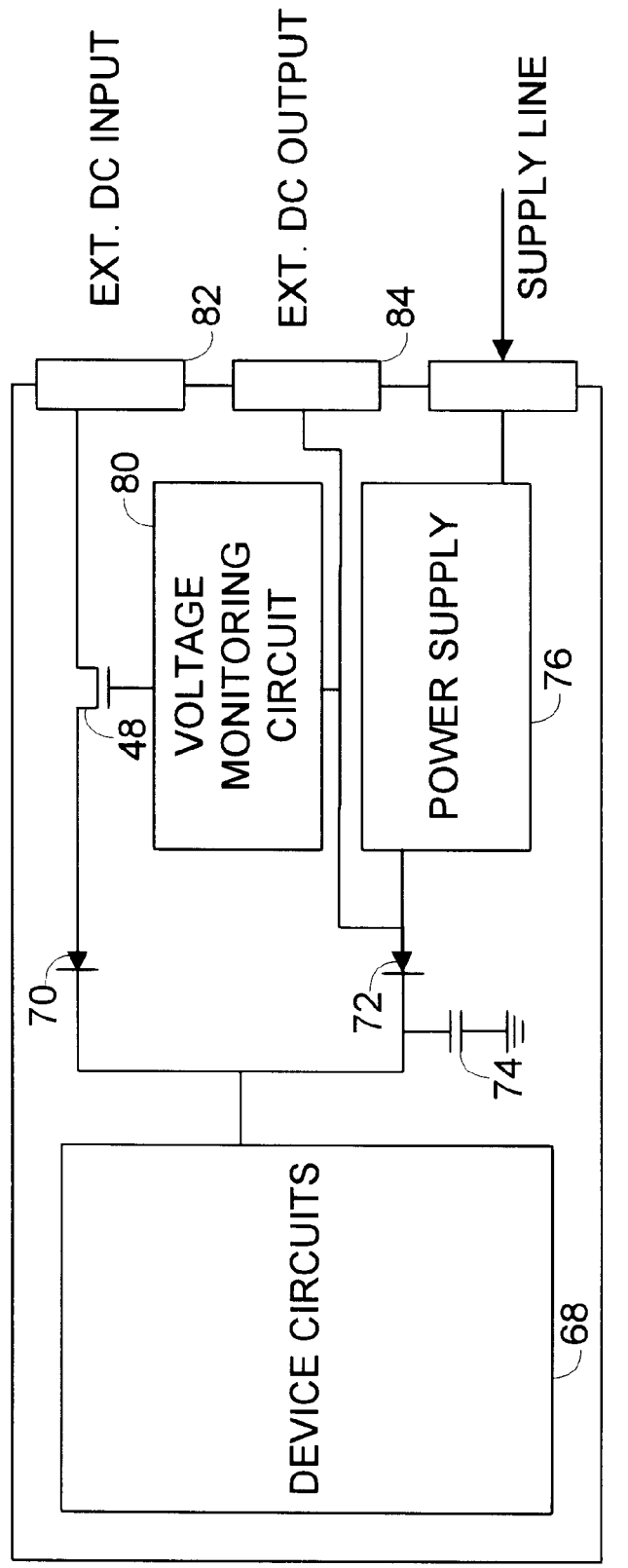
FIG. 2 is a block diagram of a computer device having a mechanism that only allows power to be provided from another computer device supply if the power supply of the device fails.

FIG. 2 is a block diagram of a device 66 having a mechanism that only allows power to be provide from another device if the power supply in device 66 fails. Device 66 includes device circuits 68, diodes 70 and 72, capacitor 74, power supply 76, FET power transistor 78, voltage monitoring circuit 80, external DC input connector 82 and external DC output connector 84. The operation of device 66 is similar to the operation of devices 14, 16, and 18 discussed above with reference to FIG. 1A, except that voltage monitoring circuit 80 and transistor 78 prevent power sharing unless power supply 76 fails.

Voltage monitoring circuit 80 monitors the voltage provided by power supply 76. As long as power supply 76 supplies a voltage above a predefined threshold (e.g. +45.0 volts for a distribution voltage of +48.0 volts), circuit 80 provides a gate signal to FET power transistor 78 that prevents transistor 78 from conducting current. However, if the voltage drops below the predefined threshold, circuit 80 signals transistor 78 to conduct current, thereby permitting redundant power to be supplied from the device upstream in the redundant power segment. Capacitor 74 is provided to supply power to device circuits 68 during the time interval between the point at which circuit 80 detects that the voltage has dropped below the threshold, and the point at which transistor 78 begins conducting current.

Figure 3:
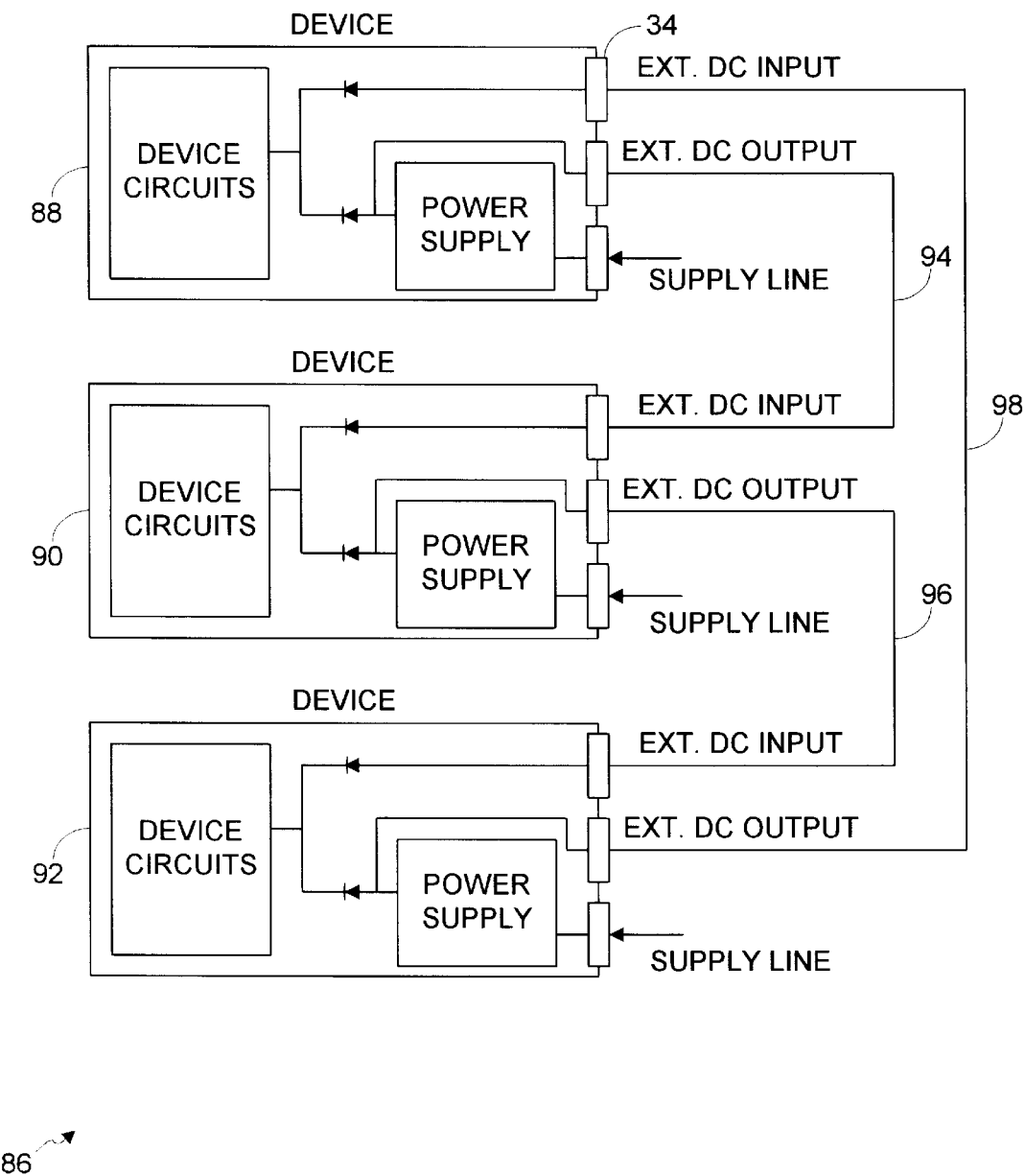
FIG. 3 is a block diagram of a second embodiment of the present invention wherein a plurality of devices are coupled into a redundant power ring to provide power supply redundancy for each other in accordance with the present invention.

FIG. 3 shows a second embodiment of the present invention wherein a plurality of devices 86 are coupled into a ring to provide redundant power for each other. Accordingly, a redundant power supply is not required. Plurality of devices 86 include devices 88, 90, and 92, which are similar to devices 14, 16, and 18 in FIG. 1A.

Power sharing cable 96 allows device 92 to receive power from device 90, power sharing cable 94 allows is device 90 to receive power from device 88, and power sharing cable 98 allows device 88 to receive power from device 92. The primary requirement in this embodiment is that each upstream power supply in the ring have sufficient capacity to drive the load in the device immediately downstream in the ring, and that the sum of all the maximum power ratings of the power supplies minus the highest single power rating of one of the power supplies must be greater than or equal to the sum of the maximum power requirements of all the device circuits in the ring. This can be expressed algebraically as follows:

$$P_{88}+P_{90}+P_{92}-P_X>W_{88}+W_{90}+W_{92}$$

where
$P_{88}$ is the maximum available power output of the power supply of device 88,
$P_{90}$ is the maximum available power output of the power supply of device 90,
$P_{92}$ is the maximum available power output of the power supply in device 92,
$P_X$ is the greater of $P_{88}$, $P_{90}$, $P_{92}$,
$W_{88}$ is the maximum load requirement of the device circuits of device 88,
$W_{90}$ is the maximum load requirement of the device circuits of device 90, and
$W_{92}$ is the maximum load requirement of the device circuits of device 92.

For example, assume that the device circuit of each device requires 100 watts, each power supply is rate (at 150 watts, and the power supply of device 90 fails. The device circuits of device 90 will draw 100 watts from the power supply of device 88. The device circuits of device 88 will draw 50 watts from its own power supply and 50 watts from the power supply of device 92. Finally, the device circuits of device 92 will draw 100 watts from its own power supply. The embodiment shown in FIG. 3 is especially useful when a large number of devices are coupled into a redundant ring, because as the number of devices in a ring increases, the excess capacity required in each power supply decreases.

Many computer devices have power supplies with power ratings substantially above the amount of current required by the device. Therefore, typically enough redundant power is available if only a few devices are coupled together into a redundant power ring. Generally, a computer rack containing a large number of identical computer devices will have enough collective surplus capacity to supply redundant power to any single device in the rack that suffers a power supply failure. Note that the power sharing mechanism of device 66 in FIG. 2 may also be used with the embodiment shown in FIG. 3. In addition, the various options discussed above with reference to the embodiment shown in FIG. 1A may also be used in the embodiment shown in FIG. 3.

The present invention provides a method and apparatus for greatly reducing the number of redundant power supplies required for a plurality of computer devices. In the first embodiment described above with reference to FIG. 1A, only a single redundant power supply is required for all devices coupled in a redundant power segment. In the second embodiment described above with reference to FIG. 3, no redundant power supplies are required and redundant power is provided by the excess capacities of all power supplies in the redundant power ring. Accordingly, the present invention greatly reduces or eliminates the need for redundant power supplies in data centers having a large number of computer devices, while still providing the same level of redundant power supply reliability provided by prior art single device N+1 power supply configurations.

Although the present invention has been described with reference to preferred embodiments, workers skilled in the art will recognize that changes may be made in form and detail without departing from the spirit and scope of the invention.

What is claimed is:

1. An apparatus for providing redundant power comprising:
    a plurality of devices, with each device comprising:
        device circuits having a power requirement;
        a power supply having a power rating sufficient to meet the power requirements of the device circuits;
        an external power input for receiving redundant power exclusively from another device;
        an external power output for providing redundant power exclusively to another device; and
        a short-preventing network that prevents a failure of the power supply of the device from shorting out a power supply in another device, and prevents a failure of a power supply in another device from shorting out the power supply of the device, wherein the short-preventing network is coupled between the device circuits, a node of the power supply that provides a power out put the external power input, and the external power output to provide power from the power supply to the device circuits, provide redundant power exclusively to another device, and receive redundant power exclusively from another device; and a first power sharing cable coupled between the external power output of a first device of the plurality of devices and the external power input of a second device of the plurality of devices, thereby allowing the first device to provide redundant power exclusively to the second device if the power supply of the second device fails.

2. The apparatus of claim 1 and further comprising:

a redundant power supply having an external power output for providing redundant power exclusively to another device; and a second power sharing cable coupled between the external power input of the first device of the plurality of devices and the external power output of the redundant power supply, thereby allowing the redundant power supply to provide redundant power exclusively to the first device if the power supply of the first device fails.

3. The apparatus of claim 1 wherein the short-preventing network comprises:

a first diode having a first terminal coupled to the external power input and a second terminal coupled to a distribution input of the device circuits;

a second diode having a first terminal coupled to the external power output and the node of the power supply that provides a power output, and a second terminal coupled to the distribution input of the device circuits.

4. The apparatus of claim 3 wherein the node of the power supply that provides a power output provides a positive distribution voltage and the first terminals of the first and second diodes are anode terminals, and the second terminals of the first and second diodes are cathode terminals.

5. The apparatus of claim 4 wherein the node of the power supply that provides a power output provides a negative distribution voltage and the first terminals of the first and second diodes are cathode terminals, and the second terminals of the first and second diodes are anode terminals.

6. The apparatus of claim 1 wherein the short preventing network includes a voltage monitoring and switching circuit that prevents the device circuits from receiving power via the external power input unless the power supply has failed.

7. The apparatus of claim 1 wherein the external power input, external power output, and short-preventing network are provided within the power supply.

8. An apparatus for providing redundant power comprising:

a plurality of devices, with each device comprising:
device circuits having a power requirement;
a power supply having a power rating sufficient to meet the power requirements of the device circuits;
an external power input for receiving redundant power from another device;
an external power output for providing redundant power to another device; and
a short-preventing network that prevents a failure of the power supply of the device from shorting out a power supply in another device, and prevents a failure of a power supply in another device from shorting out the power supply of the device, wherein the short-preventing network is coupled between the device circuits, the power supply, the external power input, and the external power output to provide power from the power supply to the device circuits, provide redundant power to another device, and receive redundant power from another device;

a first power sharing cable coupled between the external power output of a first device of the plurality of devices and the external power input of a second device of the plurality of devices, thereby allowing the first device to provide redundant power to the second device if the power supply of the second device fails; and a second power sharing cable coupled between the external power input of the first device of the plurality of devices and the external power output of the second device of the plurality of devices, thereby allowing the second device to provide redundant power to the first device if the power supply of the first device fails.

9. An apparatus for providing redundant power comprising:

a plurality of devices, with each device comprising:
device circuits having a power requirement;
a power supply having a power rating sufficient to meet the power requirements of the device circuits;
an external power input for receiving redundant power from another device;
an external power output for providing redundant power to another device; and
a short-preventing network that prevents a failure of the power supply of the device from shorting out a power supply in another device, and prevents a failure of a power supply in another device from shorting out the power supply of the device, wherein the short-preventing network is coupled between the device circuits, the power supply, the external power input, and the external power output to provide power from the power supply to the device circuits, provide redundant power to another device, and receive redundant power from another device, wherein external power input, external power output, and short-preventing network are provided within the device, but not the power supply; and a first power sharing cable coupled between the external power output of a first device of the plurality of devices and the external power input of a second device of the plurality of devices, thereby allowing the first device to provide redundant power to the second device if the power supply of the second device fails.

10. A device comprising:

device circuits having a power requirement;

a power supply having a power rating sufficient to meet the power requirements of the device circuits;

an external power input for receiving redundant power exclusively from another device;

an external power output for providing redundant power exclusively to another device; and a short-preventing network that prevents a failure of the power supply of the device from shorting out a power supply in another device, and prevents a failure of a power supply in another device from shorting out the power supply of the device, wherein the short-preventing network is coupled between the device circuits, a node of the power supply that provides a power output the external power input, and the external power output to provide power from the power supply to the device circuits, provide redundant power exclusively to another device, and receive redundant power exclusively from another device.

11. The device of claim 10 wherein the short-preventing network comprises:

a first diode having a first terminal coupled to the external power input and a second terminal coupled to a distribution input of the device circuits;

a second diode having a first terminal coupled to the external power output and the node of the power supply that provides a power output, and a second terminal coupled to the distribution input of the device circuits.

12. The device of claim 11 wherein the node of the power supply that provides a power output provides a positive distribution voltage and the first terminals of the first and second diodes are anode terminals, and the second terminals of the first and second diodes are cathode terminals.

13. The device of claim 11 wherein the node of the power supply that provides a power output provides a negative distribution voltage and the first terminals of the first and second diodes are cathode terminals, and the second terminals of the first and second diodes are anode terminals.

14. The device of claim 10 wherein the short preventing network includes a voltage monitoring and switching circuit that prevents the device circuits from receiving power via the external power input unless the power supply has failed.

15. The device of claim 10 wherein the external power input, external power output, and short-preventing network are provided within the power supply.

16. A device comprising:

device circuits having a power requirement;

a power supply having a power rating sufficient to meet the power requirements of the device circuits;

an external power input for receiving redundant power from another device;

an external power output for providing redundant power to another device; and a short-preventing network that prevents a failure of the power supply of the device from shorting out a power supply in another device, and prevents a failure of a power supply in another device from shorting out the power supply of the device, wherein the short-preventing network is coupled between the device circuits, the power supply the external power input, and the external power output to provide power from the power supply to the device circuits, provide redundant power to another device, and receive redundant power from another device, wherein external power input, external power output, and short-preventing network are provided within the device, but not the power supply.

17. A power supply comprising:

a power converter that receives a supply voltage and produces a distribution voltage at a distribution voltage output;

a device circuits power output for providing power to device circuits;

an external power input for receiving redundant power from another power supply or device;

an external power output for providing redundant power to another power supply of device; and a short-preventing network that prevents a failure of the power converter from shorting out another power supply, and prevents a failure of another power supply from shorting out the power converter, wherein the short-preventing network is coupled between, distribution voltage output of the power converter, the device circuits power output, the external power input, and the external power output to provide power from the power converter to the device circuits output, provide redundant power to another device or power supply, and receive redundant power from another device or power supply.

18. The power supply of claim 17 wherein the short-preventing network comprises:

a first diode having a first terminal coupled to the external power input and a second terminal coupled to the device circuits power output;

a second diode having a first terminal coupled to the external power output and the distribution voltage output of the power supply and a second terminal coupled to the device circuits power output.

19. The power supply of claim 18 wherein the distribution voltage output of the power converter provides a positive distribution voltage and the first terminals of the first and second diodes are anode terminals, and the second terminals of the first and second diodes are cathode terminals.

20. The power supply of claim 18 wherein the distribution voltage output of the power converter provides a negative distribution voltage and the first terminals of the first and second diodes are cathode terminals, and the second terminals of the first and second diodes are anode terminals.

21. The power supply of claim 17 wherein the short preventing network includes a voltage monitoring and switching circuit that prevents the device circuits power output from receiving power via the external power input unless the power converter has failed.

22. A method of providing redundant power comprising:

coupling a plurality of devices into a redundant segment; and receiving redundant power at a second device in the redundant segment exclusively from a first device in the redundant segment when a power supply in the second device fails.

23. The method of claim 22 wherein the redundant segment includes a redundant power supply.

24. The method of claim 22 wherein first and second ends of the redundant segment are coupled together to form a redundant ring.

* * * * *